United States Patent
Celotto et al.

(10) Patent No.: US 11,519,048 B2
(45) Date of Patent: Dec. 6, 2022

(54) METHOD FOR THE IN-LINE MANUFACTURING OF STEEL TUBE

(71) Applicant: TATA STEEL NEDERLAND TUBES BV, Oosterhout (NL)

(72) Inventors: Steven Celotto, Heiloo (NL); Gerardus Jacobus Paulussen, Beverwijk (NL); Arjen Kamp, Leiden (NL); Robertus Flipsen, Elst (NL)

(73) Assignee: TATA STEEL NEDERLAND TUBES BV, Oosterhout (NL)

(*) Notice: Subject to any disclaimer, the term of this patent is extended or adjusted under 35 U.S.C. 154(b) by 411 days.

(21) Appl. No.: 16/317,379

(22) PCT Filed: Jul. 13, 2017

(86) PCT No.: PCT/EP2017/067780
§ 371 (c)(1),
(2) Date: Jan. 11, 2019

(87) PCT Pub. No.: WO2018/011377
PCT Pub. Date: Jan. 18, 2018

(65) Prior Publication Data
US 2019/0226041 A1  Jul. 25, 2019

(30) Foreign Application Priority Data

Jul. 14, 2016  (EP) ..................... 16179417

(51) Int. Cl.
*C21D 9/08* (2006.01)
*B21C 37/08* (2006.01)
(Continued)

(52) U.S. Cl.
CPC ............ *C21D 9/08* (2013.01); *B21C 37/08* (2013.01); *C21D 1/18* (2013.01); *C21D 1/42* (2013.01);
(Continued)

(58) Field of Classification Search
CPC . C21D 9/08; C21D 1/18; C21D 6/002; C21D 1/42; C21D 6/005; C21D 6/008;
(Continued)

(56) References Cited

U.S. PATENT DOCUMENTS

2003/0145913 A1  8/2003 Toyooka et al.
2017/0362678 A1* 12/2017 Goto ................... C21D 9/08
2018/0214924 A1*  8/2018 Singh .................. C22C 38/38

FOREIGN PATENT DOCUMENTS

CN   103131947 A   6/2013
EP     2752499 A1   7/2014
(Continued)

OTHER PUBLICATIONS

Poor et al ("Furnace Atmospheres for Heat Treating", ASM Handbook, vol. 4B, Steel Heat Treating Technologies, 2014). (Year: 2014).*

(Continued)

*Primary Examiner* — Robert S Jones, Jr.
*Assistant Examiner* — Jiangtian Xu
(74) *Attorney, Agent, or Firm* — Vorys, Sater, Seymour and Pease LLP

(57) ABSTRACT

A method for manufacturing of steel tube from a long steel strip, including providing a length of steel strip material to the process, forming a tube of the steel strip material, welding the formed tube in longitudinal direction, giving the tube a heat treatment wherein the mentioned steps are performed in one continuous in-line manufacturing line and the heat treatment includes a heating regime such that in successive cross-sections of the tube a microstructure is achieved which holds at least 50 vol % austenite and a cooling trajectory to re-introduce ferrite, and/or bainite in desired volume fractions.

20 Claims, 8 Drawing Sheets

(51) Int. Cl.
  *C21D 8/10* (2006.01)
  *C21D 9/50* (2006.01)
  *C21D 1/18* (2006.01)
  *C21D 1/42* (2006.01)
  *C21D 6/00* (2006.01)
  *C22C 38/00* (2006.01)
  *C22C 38/02* (2006.01)
  *C22C 38/22* (2006.01)
  *C22C 38/24* (2006.01)
  *C22C 38/26* (2006.01)
  *C22C 38/28* (2006.01)
  *C22C 38/32* (2006.01)
  *C22C 38/38* (2006.01)

(52) U.S. Cl.
  CPC ............ *C21D 6/002* (2013.01); *C21D 6/005* (2013.01); *C21D 6/008* (2013.01); *C21D 8/10* (2013.01); *C21D 8/105* (2013.01); *C21D 9/50* (2013.01); *C22C 38/002* (2013.01); *C22C 38/02* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C21D 2211/001* (2013.01); *C21D 2211/002* (2013.01); *C21D 2211/005* (2013.01)

(58) Field of Classification Search
  CPC . C21D 8/10; C21D 8/105; C21D 9/50; C21D 2211/001; C21D 2211/002; C21D 2211/005; B21C 37/08; C22C 38/002; C22C 38/02; C22C 38/22; C22C 38/24; C22C 38/26; C22C 38/28; C22C 38/32; C22C 38/38
  See application file for complete search history.

(56) References Cited

FOREIGN PATENT DOCUMENTS

| | | |
|---|---|---|
| EP | 2778239 A1 | 9/2014 |
| EP | 2837708 A1 | 2/2015 |
| JP | H06256854 A | 9/1994 |
| JP | 2000119754 A * | 4/2000 |
| JP | 2000119754 A | 4/2000 |
| JP | 2001164319 A | 6/2001 |
| JP | 2002294403 A | 10/2002 |
| JP | 2008019480 A | 1/2008 |
| JP | 2012021181 A | 2/2012 |

OTHER PUBLICATIONS

Fukushima ("Recent Technological Progress in High Speed Continuous Annealing", Transactions ISIJ, vol. 25, 1985 (278)) (Year: 1985).*
Shinya et al (JP2000119754A) an English translation by machine (Year: 2020).*
Afghoul et al ("Coiled Tubing: The Next Generation", Oilfield Review, 2004). (Year: 2004).*
International Search Report and Written Opinion dated Oct. 12, 2017 for PCT/EP2017/067780 to Tata Steel Nederland Tubes BV filed Jul. 13, 2017.
Translation of Japanese Office Action dated Jan. 28, 2022 to Tata Steel Nederland Tubes BV for JP Patent Application No. 2019-523181.

* cited by examiner

METHOD FOR THE IN-LINE MANUFACTURING OF STEEL TUBE

CROSS-REFERENCE TO RELATED APPLICATIONS

This is a § 371 National Stage Application of International Application No. PCT/EP2017/067780 filed on Jul. 13, 2017, claiming the priority of European Patent Application No. 16179417.7 filed on Jul. 14, 2016.

FIELD OF THE INVENTION

The invention relates to a method for the in-line manufacturing of various grades of steel tube from steel strip material, wherein steel tubes with different mechanical properties are made from one and the same strip material.

BACKGROUND OF THE INVENTION

The manufacturing of steel tubes in most cases is done by using a steel strip with predefined mechanical properties in order to get a tube with certain mechanical properties. However, the mechanical properties of roll formed and seam welded tubes are different from those of the steel strip from which they are manufactured.

Specifically, the ductility is less because of:
the deformation of the steel material that occurs during the forming of the flat strip into a cylindrical shape, and
the welding of the tube seam results in a local deterioration of the mechanical properties on and near the weld due to local hardening and heat affected zone effects.

These factors combined result in the total elongation of a welded tube, i.e. the ductility of the final tube, to be very much lower, which could be down to half of the ductility of the steel strip material used to make the tube. The mechanical properties of the finished tube are therefore comprised of the lowest of the values for yield stress, tensile stress and ductility for the formed, welded and heat affected zones of the tube and by this, the degrees of freedom in designing the part for which the finished tube is used are reduced.

The weld seam properties of the tube generally differ to the properties of the rest of the tube. When an end-user needs a finished tube or part thereof to deform it in a processing line into a specific part, extra equipment and tools are needed to position the weld seam in the processing line in such a manner that the weld seam is located at the least deformed position of the part, which also reduces the degrees of freedom in designing the part.

In order to fulfil the many specific end-user specifications a high associated strip feedstock level is required. For each variation of mechanical properties, a separated coil feedstock level is required to be able to produce the tubes with the required properties.

For the manufacturing of advanced high strength steel tubes, a dedicated roll forming tool set is needed for each strength level or grade of steel strip material, compared to standard tool sets that are needed for standard grades. This adds tooling cost for each new tube size that needs to be produced in advanced high strength steel (AHSS) grades.

OBJECTIVES OF THE INVENTION

It is an objective of the present invention to provide a method to manufacture from a feedstock steel strip material tube with controlled mechanical properties.

It is an objective of the present invention to provide a method to manufacture from a feedstock steel strip material tube with a range of controlled but different mechanical properties.

It is an objective of the present invention to provide a method to manufacture from a feedstock steel strip material tube with controlled mechanical properties that are different from the feedstock steel strip material.

It is another objective of the present invention to provide a method to manufacture from a steel strip material seam welded tube wherein the mechanical properties of the tube are uniform, or close thereto, along the tube circumference, including the weld and its heat affected zone.

It is another objective of the present invention to provide a method to manufacture advanced high strength precision tubes in a cost effective manner by incorporating the full range of the aforementioned objectives in a single processing line.

The invention provides a method for manufacturing of steel tube from a long steel strip, comprising providing a length of steel strip to the process, forming a tube of the steel strip, welding the formed tube in longitudinal direction, giving the tube a heat treatment, characterised in that the mentioned steps are performed in one continuous in-line manufacturing line, the heat treatment comprises a heating regime such that in successive cross-sections of the tube a microstructure is achieved which holds at least 50 vol% austenite and a cooling trajectory to re-introduce ferrite, and/or bainite in desired volume fraction. The heating of the tube may be done in a controlled atmosphere, e.g. a nitrogen-hydrogen atmosphere.

DESCRIPTION OF THE INVENTION

Figure 1:
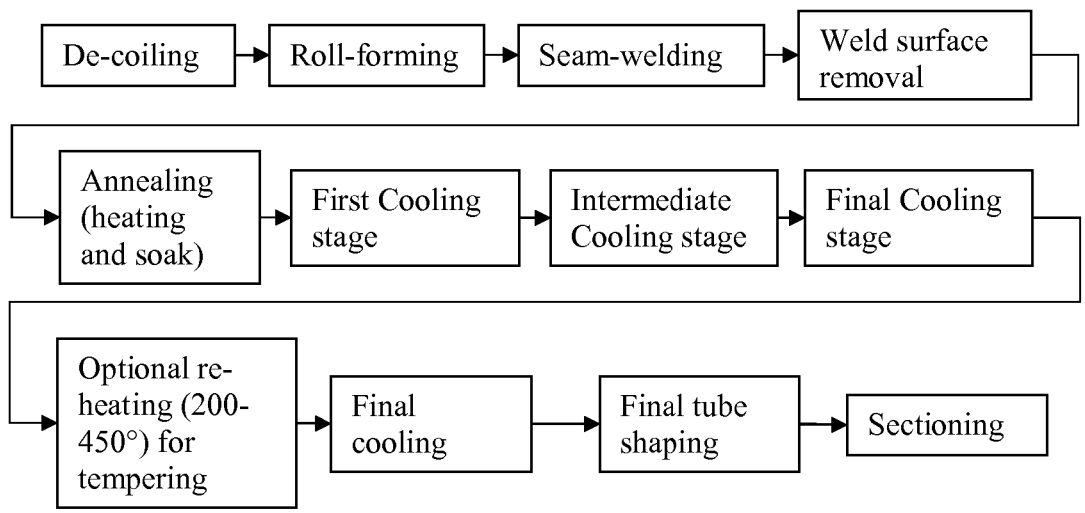
FIG. 1 is a schematic of the process steps and their order.

According to the invention at least one of the objectives of the invention is realized by providing a process according to which a steel strip is fed into a manufacturing line wherein it is slit to meet the circumference and diameter dimensional requirements of the tube, roll formed into a tube, welded along a length to complete the tube form, scraped along the weld to remove any proud surface parts and extruded oxides from the weld, and then in a downstream section of the same manufacturing line, heat treated to achieve the final mechanical properties. In such an in-line heat-treatment process, the tube is held under slight tension that is of sufficient level to maintain alignment throughout all process steps, in particular the thermal processing. The heat-treatment in this process consists of one or more heating, holding and cooling segments of the thermal cycle in various combinations and at various rates. In particular, at least one of the objectives of the invention is realised by providing a process according to the claims.

In the first part of the thermal cycle the tube is heated to a sufficiently high temperature that the consequences of the roll forming and welding process will sufficiently diminish or even be eradicated.

In the following, reference is made to the metallurgical terms Ac1, Ac3, inter-critical and supercritical regime. The inter-critical regime, which exists above Ac1 and below Ac3, is where the microstructure consists of a mixture of ferrite and austenite. The super-critical regime, above Ac3, is where the steel becomes fully austenitic, and has the face-centred-cubic crystal structure phase of iron. Ac1 refers to the temperature at which the phase transformation of the body-centred cubic crystal structure phase of iron, ferrite, begins to transform into austenite. Ac3 refers to the temperature at which the last regions of ferrite transform into austenite. Both Ac1 and Ac3 are dependent on the steel chemical composition and the heating rate.

An increased heating rate increases both Ac1 and Ac3, but the desired fraction of austenite can be achieved by heating continuously or by a sufficiently long duration hold or soak above the equilibrium solvus temperatures for the intercritical regime (Ae1) or the super-critical regime (Ae3) for full austenitisation.

In the annealing process described to sufficiently diminish or even eradicate the original roll-formed and weld seam microstructure, the peak temperature and soak time at this temperature need to be sufficient to achieve a volume fraction of austenite of at least 50%. This volume fraction of austenite can ultimately be 100%, which means heating up to Ac3 or above or soaking at or above temperature Ae3 for a sufficiently long time to approach equilibrium.

The final microstructure after heat treatment needs to be the correct balance of ferrite, martensite, bainite and austenite, to achieve the desired combination of mechanical properties such as yield strength, ultimate tensile strength, uniform elongation, total elongation and other mechanical properties related to the intended manufacture and use of the tube product. Martensite and bainite are microstructure constituents consisting of fine crystallite sized ferrite phase super-saturated in carbon and in the case of bainite, with the additional presence of sub-micro sized particles of cementite phase. Both martensite and bainite impart strength, but a too high fraction of these microstructure constituents in the final microstructure results in insufficient ductility and formability. The minimum fraction of ferrite to deliver sufficient formability is 50%. Decreasing the volume fraction of ferrite from 95% down to 50% increases the strength level of the tubes, where the ultimate tensile strength will typically increase from about 600 MPa up to 1000 MPa or higher.

As stated previously, the heating process to sufficiently diminish or even eradicate the original roll-formed and weld seam microstructure requires a peak temperature and soak time to achieve a volume fraction of austenite of at least 50% up to 100%, the latter state being full austenitisation. However, if all of this austenite phase fraction transforms into martensite or bainite, the volume fraction of these hard constituents in the final microstructure will also be correspondingly high which may result in the final strength and ductility being different from their target values.

It may therefore be necessary to transform some of the austenite back into ductile constituents, such as ferrite, by cooling slowly or interrupting the cooling process before hard constituents are formed. Doing so will produce a sufficiently soft matrix to achieve the ductility and formability requirements of the final product. The ferrite can be in the form of so-called epitaxial ferrite from the re-growth of existing ferrite present during intercritical annealing, or polygonal ferrite nucleated from the fully austenitised microstructure that form from super-critical annealing, or bainite that also forms by nucleating from the fully austenitised microstructure that is formed by super-critical heating.

Polygonal ferrite forms at a high temperature regime, generally above 550° C., depending on the chemical composition, whereas bainite forms below 600° C., also depending on the chemical composition. The most ductile form of ferrite is the polygonal form. Ferrite in the form of bainite can be advantageous as it is finer grained than the polygonal ferrite form. When the majority matrix phase is bainite, higher strength levels can be achieved, typically with ultimate tensile strength of 800 MPa of higher. The particular difference compared to when the majority matrix phase is polygonal or epitaxial ferrite is that the tensile yield strength is also high, being approximately 0.75 of the ultimate tensile strength.

Once the desired volume fraction of ferrite has formed, whether that is as polygonal, epitaxial (re-growth) ferrite or bainitic, the tube can be cooled at a faster rate in order to transform fully or partially the remaining austenite into hard microstructure constituents of martensite or fine (lower) bainite.

In cases where the annealing temperature is below Ac3 and thus intercritical, ferrite is already present in the microstructure upon the start of cooling, the presence of ferrite at the beginning of the cooling trajectory can be both advantageous and disadvantageous. It accelerates the re-formation of ferrite because no nucleation is required. As can be seen in continuous cooling transformation (CCT) diagrams and time-temperature transformation (TTT) diagrams, the formation of ferrite when holding or cooling just below the Ar3

(the cooling equivalent of Ac3) requires either very slow cooling rates or long holding times.

For a typical commercial high-strength dual-phase composition with a carbon equivalent greater than 0.25 wt %, the hold time can be well over 10 seconds before ferrite transformation begins upon cooling after full austenitisation (i.e. above Ac3) and will be several tens of seconds before a volume fraction greater than 50% is achieved in order to have a sufficient amount of soft matrix for ductility and/or formability. Cooling from the intercritical regime with a relatively high fraction of austenite by annealing to just below the Ac3 temperature, results in faster ferrite re-transformation kinetics. A disadvantage is that the microstructure can be coarser than that forming from a fully austenitic microstructure. A solution to this is fast cooling down from the intercritical regime to force some nucleation of new ferrite grains to occur, which results in a finer ferrite grain size.

In the solution described in this patent, the thermal process is taking place in a downstream section of one and the same tube manufacturing line. Typical line-speeds are approximately 20 to 160 metres per minute (approximately 0.3 to 2.7 metres per second). Every second of heat treatment time adds metres to the manufacturing line length. As a result a heat treatment that can be completed within a short time span is relevant for the economic feasibility of the process. The time required for the necessary transformations can be shortened by cooling down to a temperature regime where the kinetics are faster as shown in the CCT and TTT diagrams for a given chemistry (see FIG. 7).

The time-temperature trajectory can be cooling through the fast kinetic regime at an appropriate rate. Alternatively the time-temperature trajectory can contain an interrupt, where after initial fast cooling down to a holding temperature, the cooling is stopped or slowed down to a much slower rate to allow the transformations occur. Such an interrupted cooling trajectory can be carried out by either starting from the intercritical temperature regime (between Ac1 and Ac3) or from the supercritical fully austenitised regime (above Ac3). The choice of starting from just below or above the Ac3 determines the cooling trajectory to achieve the ferrite formation in a feasible period.

The type of ferrite formed depends also on the cooling trajectory passed through including possible cooling interrupts. For polygonal or epitaxial re-growth of ferrite, a temperature of above 550° C. is important, depending on the chemical composition of the substrate. For ferrite forming the bainite transformation, a temperature of below 600° C. is important, depending on the chemical composition of the substrate. For a given chemical composition, the overlap between the polygonal or epitaxial re-growth of ferrite regime and the bainite transformation is less than 50° C. and corresponds to a region in TTT diagrams that is called a 'bay'. It is a region where both the epitaxial re-growth of ferrite regime and the bainite transformation decrease and the measurable start of the transformation takes longer.

This retardation is not critical to the process, but is preferably avoided as it extends the process time needed to reach a target final composition.

The cooling trajectory design therefore has to satisfy two objectives; the first objective of the cooling is to transform the austenite phase, which is the predominant phase formed during annealing, in order to sufficiently diminish or even eradicate the original roll-formed microstructure, into the correct volume fractions of ductile ferrite and hardening microstructure constituents, the latter being martensite, bainite or austenite.

The second objective for the cooling trajectory is to produce the correct proportion of desirable phases. This design is dependent on whether the initial microstructure is a mixture of ferrite and austenite from intercritical annealing, or fully austenitic by annealing supercritically above the Ac3 temperature for sufficiently long times above the Ae3 for the given substrate chemical composition. The optimal regimes to achieve short process times are where the temperature is at the level near the so-called transformation noses, where the start times of the ferrite phase and/or bainite microstructure constituent formation are short.

Once the appropriate volume fraction of ferrite is formed, whether that is in the form of polygonal, epitaxial re-growth or bainitic, the cooling can be continued and controlled to transform the residual austenite into harder martensite or fine lower bainite.

The formation of the appropriate proportions of ferrite, bainite, martensite or retained austenite can be achieved by a single constant cooling rate trajectory. However, multi-staged cooling trajectories can also be employed in order to have better control over the transformation product quality and quantities.

In the drawings:

FIG. 1 is a schematic of the process steps and their order.

Figure 2:
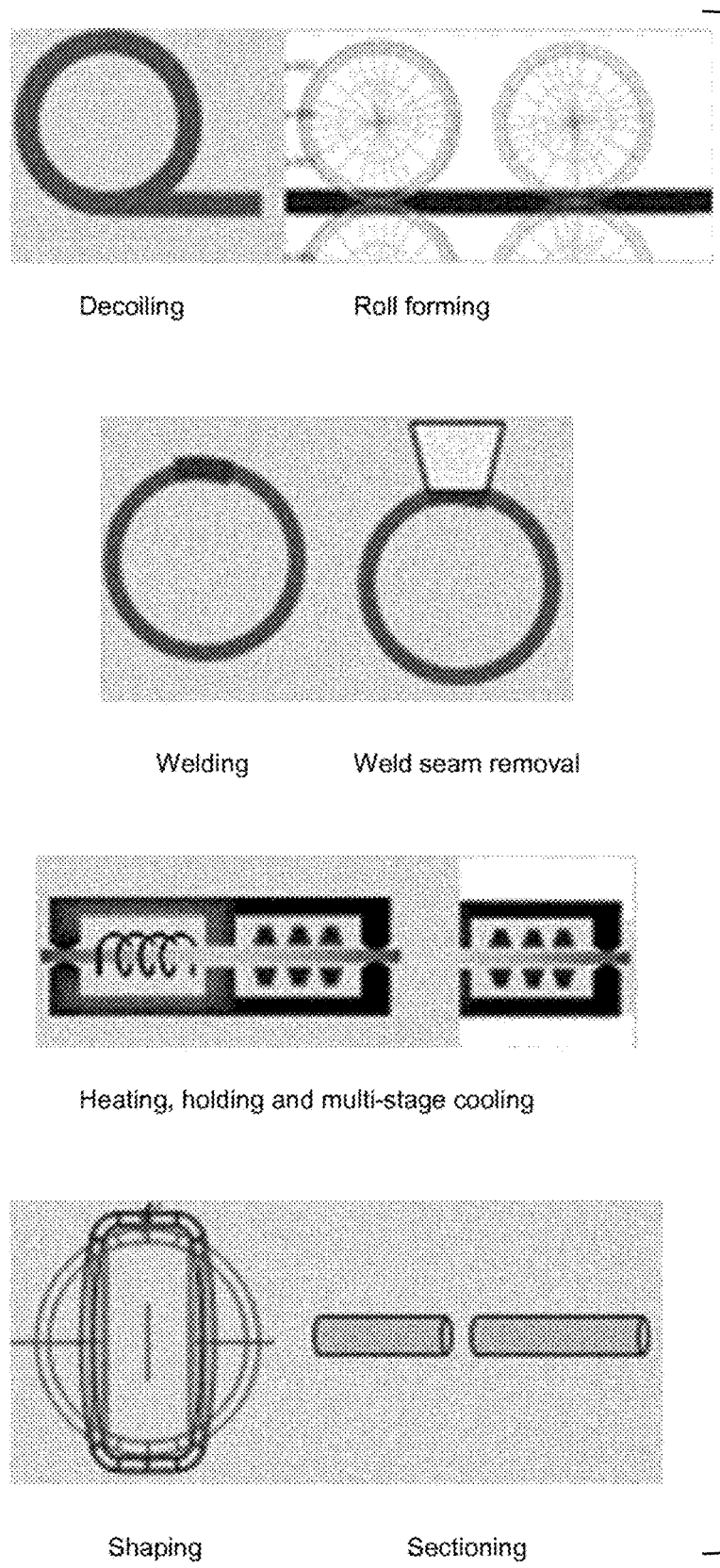
FIG. 2 is a schematic of the process line configuration.

FIG. 2 is a schematic of the process line configuration.

Figure 3:
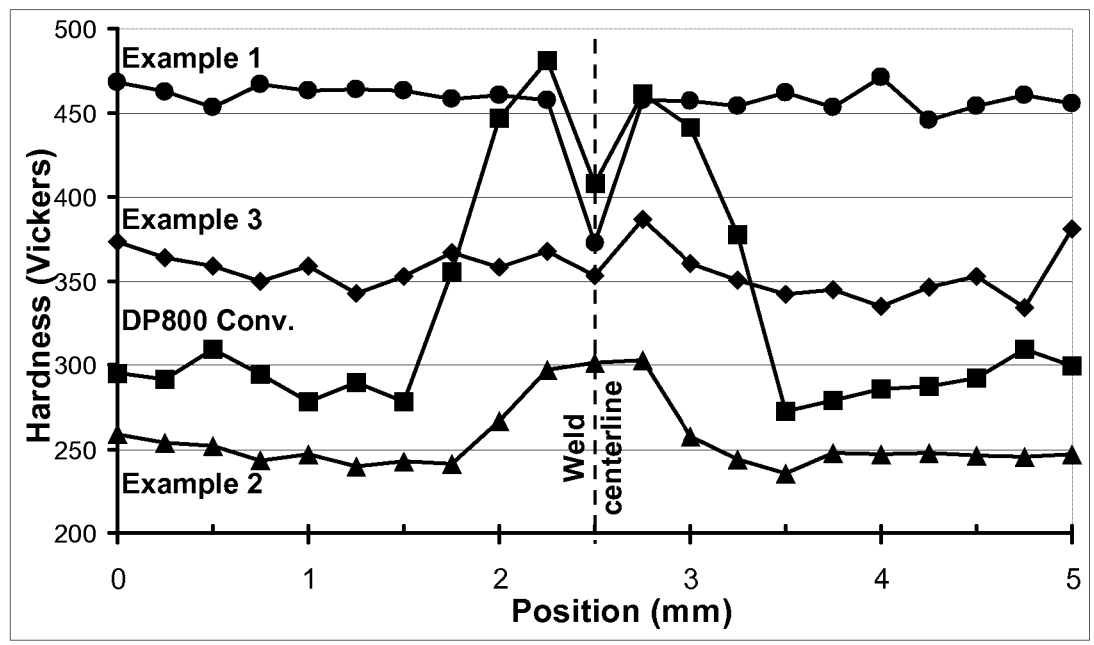
FIG. 3 is a hardness profile across seam weld for a standard processed DP800 welded tube indicated with DP800 Conv., a tube inter-critically annealed at a temperature below 50% austenitisation (730° C.) indicated as Example 2, a tube inter-critically annealed at a temperature above 50% austenitisation (780° C.) indicated as Example 3 and a tube fully austenitised (850° C.) indicated as Example 1.

FIG. 3 is a hardness profile across seam weld for a standard processed DP800 welded tube indicated with DP800 Conv., a tube inter-critically annealed at a temperature below 50% austenitisation (730° C.) indicated as Example 2, a tube inter-critically annealed at a temperature above 50% austenitisation (780° C.) indicated as Example 3 and a tube fully austenitised (850° C.) indicated as Example 1.

Figure 4:
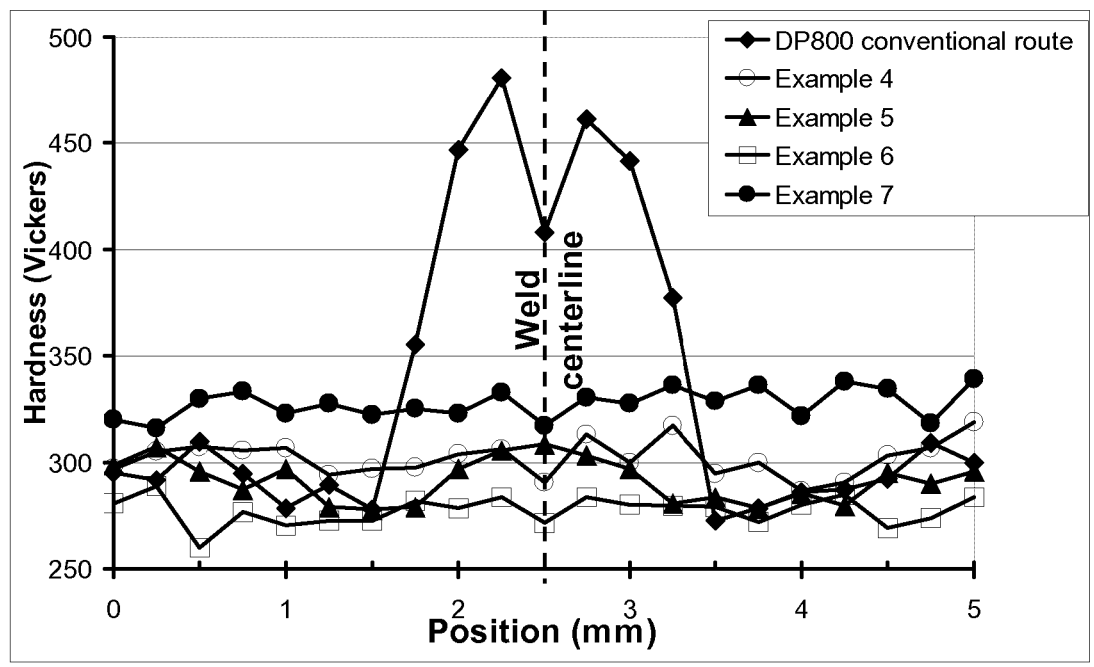
FIG. 4 is a hardness profile across seam weld for a standard processed DP800 welded tube indicated as DP800 conventional route, and various annealed tubes where the top temperature is above 50% austenitisation (780° C.) or even fully austenitised, followed by various cooling trajectories, respectively indicated as Examples 4, 5, 6 and 7.

FIG. 4 is a hardness profile across seam weld for a standard processed DP800 welded tube indicated as DP800 conventional route, and various annealed tubes where the top temperature is above 50% austenitisation (780° C.) or even fully austenitised, followed by various cooling trajectories, respectively indicated as Examples 4, 5, 6 and 7.

Figure 5:
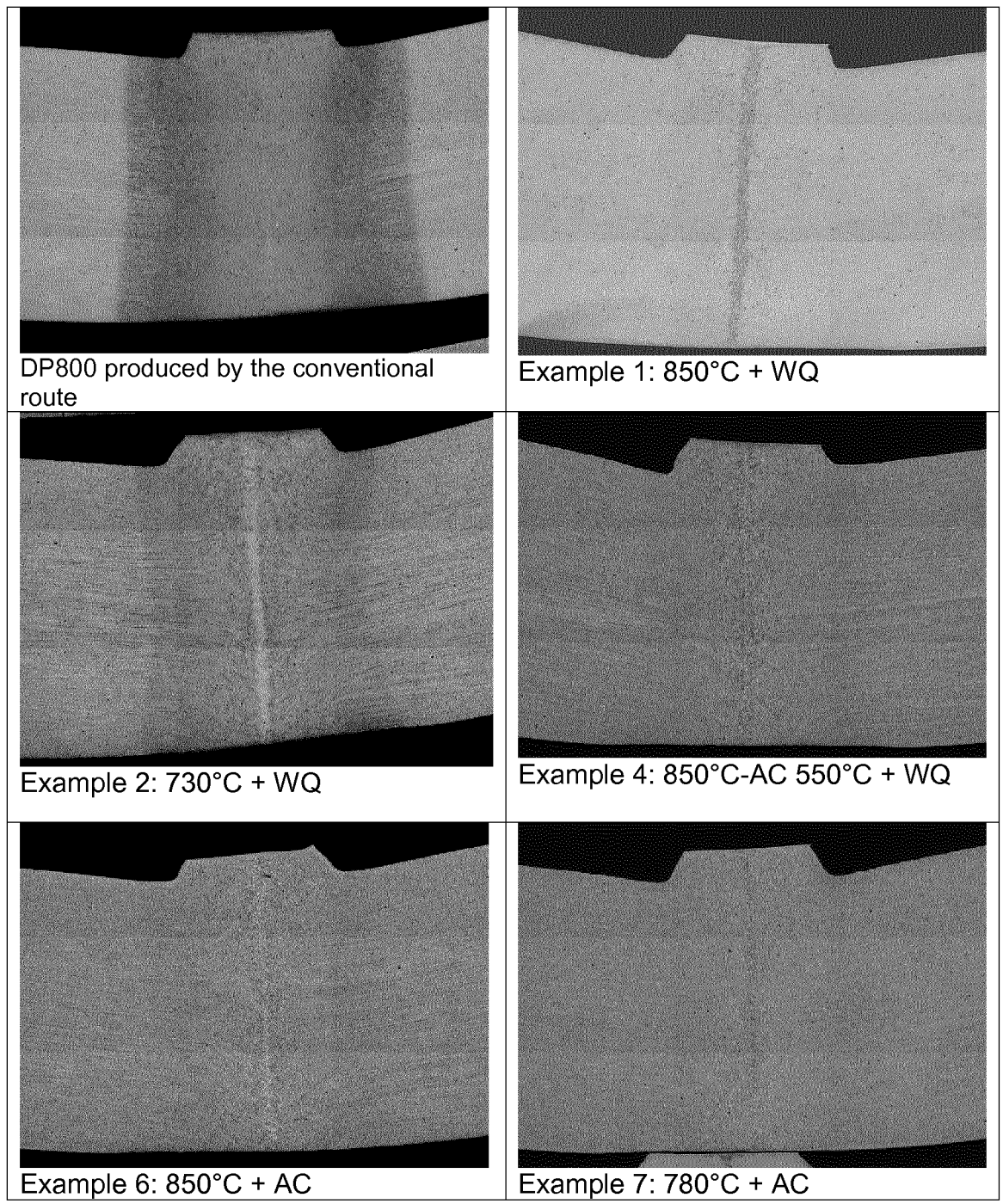
FIG. 5 represents optical micrographs of the seam weld of tubes for standard processed DP800 welded tube indicated as DP800 produced by the conventional route, Example 1 where a tube is fully austenitised (850° C.) annealed and water-quenched (not according to the invention), inter-critically annealed at a temperature below 50% austenitisation (730° C.) and water quenched (reference Example 2), fully austenitised (850° C.) annealed followed by slow-cooling down to 550° C. and then quenched (according to the invention, Example 4), fully austenitised (850° C.) annealed followed by slow-cooling down to 400° C. and water quenched (Example 6), and inter-critically annealed at a temperature above 50% austenitisation (780° C.) and water quenched (Example 7).

FIG. 5 represents optical micrographs of the seam weld of tubes for standard processed DP800 welded tube indicated as DP800 produced by the conventional route, Example 1 where a tube is fully austenitised (850° C.) annealed and water-quenched (not according to the invention), inter-critically annealed at a temperature below 50% austenitisation (730° C.) and water quenched (reference Example 2), fully austenitised (850° C.) annealed followed by slow-cooling down to 550° C. and then quenched (according to the invention, Example 4), fully austenitised (850° C.) annealed followed by slow-cooling down to 400° C. and water quenched (Example 6), and inter-critically annealed at a temperature above 50% austenitisation (780° C.) and water quenched (Example 7).

Figure 6:
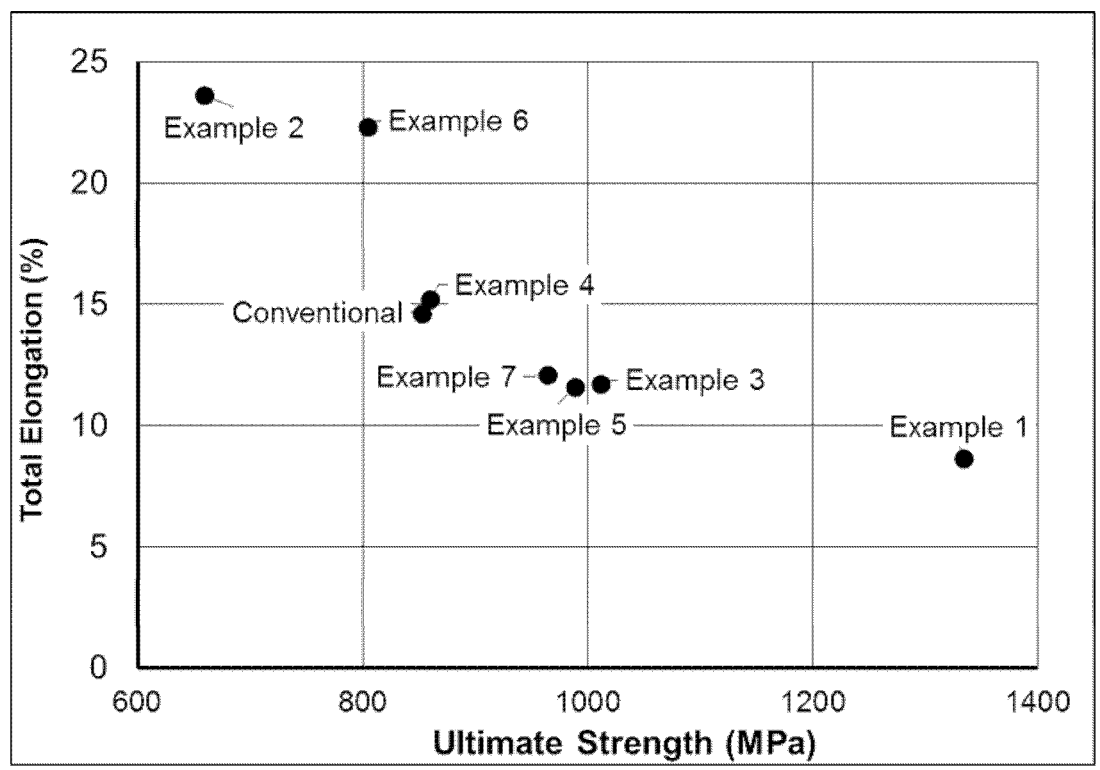
FIG. 6 is a tensile strength (Rm)/elongation overview graph showing an indication of the variations in mechanical properties that are obtained according to the invention by the process of controlled heating and cooling after the tube roll forming and welding compared to untreated tubes made out of the same strip material indicated by the open circle (o).

FIG. 6 is a tensile strength (Rm)/elongation overview graph showing an indication of the variations in mechanical properties that are obtained according to the invention by the process of controlled heating and cooling after the tube roll forming and welding compared to untreated tubes made out of the same strip material indicated by the open circle (o).

Figure 7:
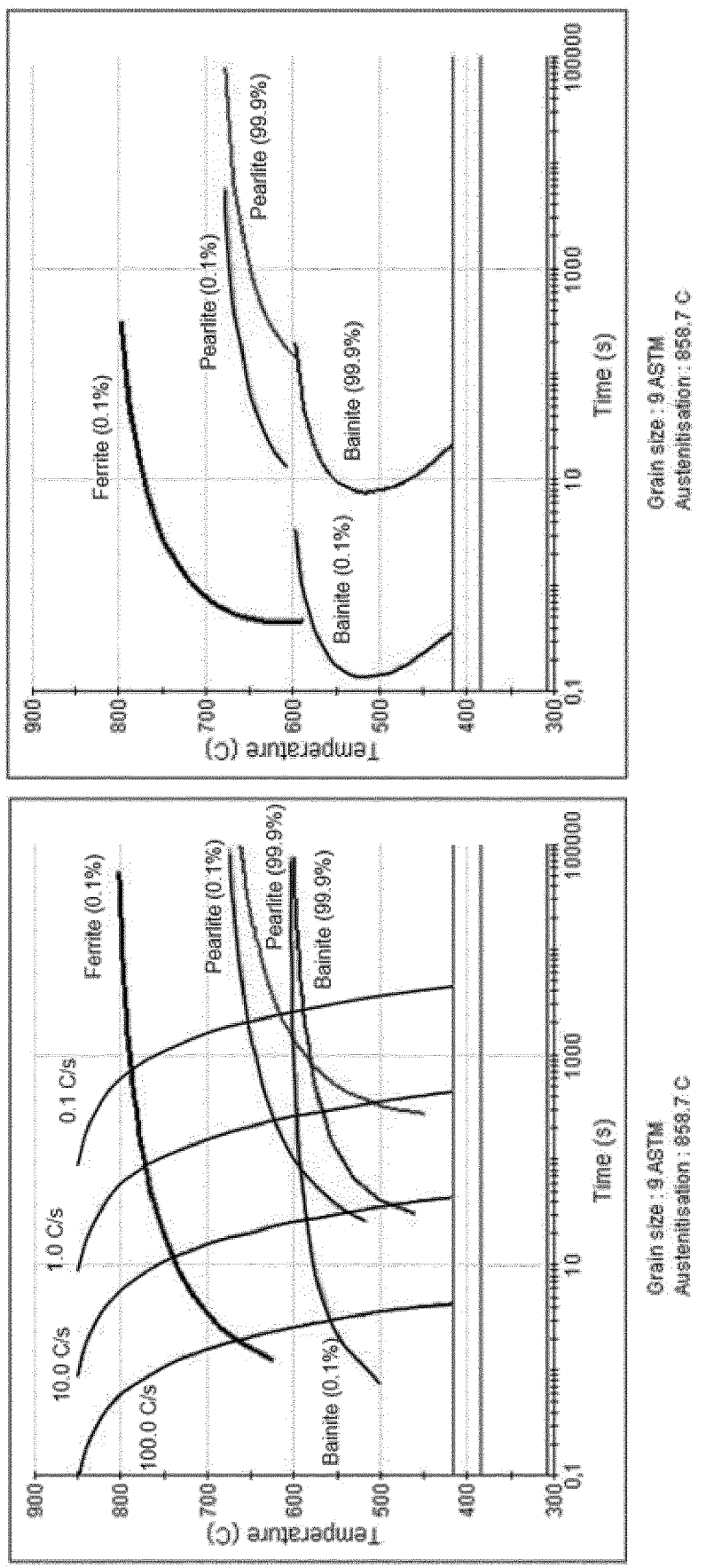
FIG. 7 represents continuous cooling transformation (CCT) and temperature-time transformation (TTT) diagrams for a typical composition used in the process according to the invention, denoted by Fe-0.12C-1.8Mn-0.1Si (wt %).

FIG. 7 represents continuous cooling transformation (CCT) and temperature-time transformation (TTT) diagrams for a typical composition used in the process according to the invention, denoted by Fe-0.12C-1.8Mn-0.1Si (wt %).

In the figures reference is made to Examples as indicated in table 1, wherein Examples 1-3 are reference examples not according to the invention and Examples 4-7 are examples according to the invention. All examples are fabricated from a cold-rolled dual-phase DP800 strip.

TABLE 1

List of Examples

| Code | Description |
|---|---|
| Conventional | DP800 produced by the conventional route |
| Example 1 | Heated to 850° C. followed by water-quench |
| Example 2 | Heated to 730 followed by water-quench |
| Example 3 | Heated to 780 followed by water-quench |
| Example 4 | Heated to 850° C. followed by air-cool to 550° C. followed by water-quench |
| Example 5 | Heated to 850° C. followed by air-cool 650° C. followed by water-quench |
| Example 6 | Heated to 850° C. followed by air-cool |
| Example 7 | Heated to 780 followed by air-cool |

FIG. 2 shows schematic drawings of the production process from the uncoiling of the incoming strip to the in-line cutting of the heat treated tubes. This schematic drawing indicates the location of the heat treatment steps in the process of producing welded tubes. The figure shows it as an intermediate step between weld seam scraping and shaping of the final tube.

FIG. 3 shows the Vickers micro-hardness profile transverse across the weld seam of a conventional welded tube along with similar micro-hardness profiles for tubes that have been annealed at temperatures in the inter-critical regime (between Ac1 and Ac3) and supercritical (above Ac3). The examples are for welded tubes fabricated from a cold-rolled dual-phase DP800 strip substrate. The hardness profile across the weld for the conventionally produced DP800 tube shows a significant hardness difference between the base material either side of the weld, which has an average hardness of approximately 280 HV outside the weld and heat-affected-zone, whereas the peak hardness within the weld region is over 450 HV, giving a difference of about 60% compared to the base material. This difference is because the weld seam is fully martensitic, whereas the base metal is a dual-phase microstructure consisting of soft ferrite and islands of martensite. The fully martensitic microstructure in the weld is a consequence of the high heating of material near the weld and the subsequent fast cooling. The difference in microstructure is also clearly visible in the macrograph of the weld seam shown in FIG. 5. The weld zone and adjacent heat affected zone are darker than the surrounding dual/phase DP800 microstructure.

Also shown in FIG. 3 is a plot of the hardness profile across the weld region for a tube of one and the same chemical composition that has been heat treated to 850° C., which is a temperature above the Ac3 for this dual-phase DP800 chemical composition (Fe-0.12 wt % C-2.0 wt Mn-0.2 wt % Si-0.5 wt % Cr-0.016 wt % Nb). Upon reaching the top temperature of 850° C., the tube was water quenched, where all of the austenite transformed into martensite making the tube microstructure wholly martensitic (Example 1).

This type of thermal processing of tubes is well known and usually involves an additional thermal heat treatment, a tempering step, where the tube is re-heated to a temperature above 200° C. for several minutes. The hardness profile across the weld after the full austenitisation and quenching heat treatment of the tube is uniform with no difference between the bulk of the tube and the weld, with only a dip at exactly the mid-line of the weld, which is due to inclusions and coarse austenite grain formation that has led to less than 100% volume martensite formation.

The lowest hardness profile shown in FIG. 3 is an example (Example 2) where the annealing step is intercritical (between Ac1 and Ac3), but at a temperature where the austenite volume fraction was about 30%. After reaching this temperature, the tube was water quenched to transform the approximately 30% volume austenite in the microstructure into martensite to make a dual phase microstructure. The hardness profile across the weld of this tube shows a pronounced peak at the weld zone.

This is because the initial fully martensitic microstructure of the weld zone has not be sufficiently eradicated as only 30% volume of it was transformed into austenite and the remaining martensite was tempered. The tempered martensite is softer than the original martensite, but is still significantly harder than the soft ferrite matrix that makes up the dual-phase microstructure in the adjacent tube material. Consequently, there is still a hardness difference of over 20% between the weld zone and adjacent base material.

This tube is shown as Example 2 in FIG. 5 and the weld zone and adjacent heat affected zone are clearly distinguishable from the surrounding light dual-phase microstructure.

Lastly in FIG. 3, the hardness profile across the weld for a tube with a similar heat treatment to the invention is shown (Example 3). In Example 3, the welded tube was annealed into the inter-critical regime to above 50% volume fraction of austenite, which for this composition is 780° C. and then water quenched. Note how the hardness profile is flat with essentially no difference between the weld zone and the adjacent regions on either side. However, by direct quenching immediately after annealing into the inter-critical regime to above 50% volume fraction of austenite, there is a minimum strength and maximum ductility that can be achieved. In order to increase ductility, a cooling trajectory is required to re-introduce ferrite, and/or bainite in desired volume fractions.

These examples demonstrate the necessity of annealing to a temperature where at least 50% of the microstructure transforms to austenite, before cooling, in order to sufficiently eradicate the weld microstructure.

FIG. 4 shows the Vickers micro-hardness profile measurements of DP800 tube manufactured according to the conventional process, without a heat treatment. The figure further shows the results for four heat treatments applied by the means of the invention or in a similar method. For all tube examples near uniform hardness levels were achieved throughout the tube, for the base material, the weld and the heat-affected zone.

Furthermore the hardness values are similar to the original DP800 substrate. The absence of the high hard peak that is found in DP800 manufactured according to the conventional process, is obvious. This improved uniformity is further demonstrated by the cross-sectional analyses shown in FIG. 5. In the inventive Examples 4, 6 and 7, the weld is barely distinguishable from the adjacent material. The microstructure of these tubes is homogeneous around the whole circumference.

FIG. 6 shows laboratory results of the variations of mechanical properties that can be obtained by controlled heating and controlled cooling of tubes after the tubes roll forming and welding process. The results provide an indication of the variations that can be achieved with a single chemistry. The range of microstructures and corresponding mechanical properties can be extended by adding more variants in the applied heat treatments compared to the heat treatments that were applied in the demonstration tests as shown in FIG. 6.

Figure 8:
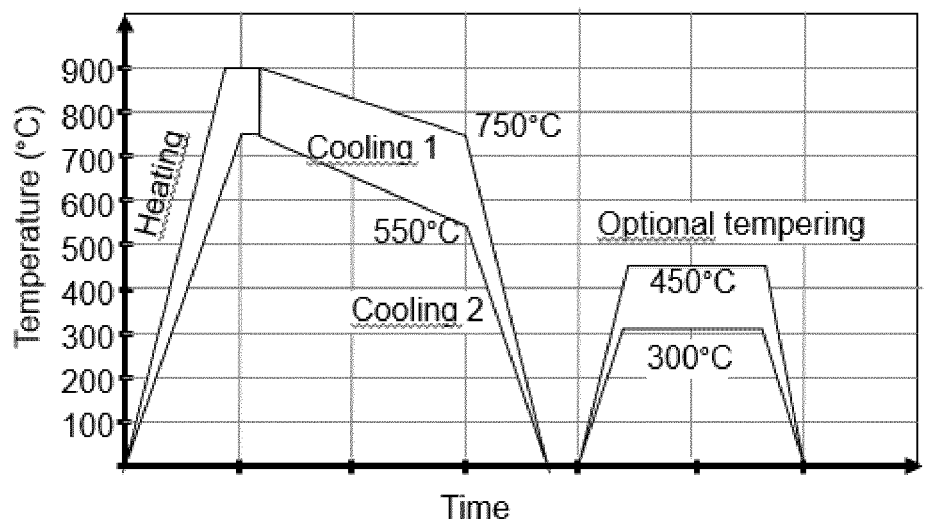
FIG. 8 shows a schematic of a heat treatment with a Type 1 cooling trajectory (slow cooling, fast cooling).

In FIG. 8 a schematic is shown of a heat treatment with a Type 1 cooling trajectory (slow cooling, fast cooling). After heating to achieve at least 50% austenite in the microstructure, the tube passes through a cooling regime (indicated as Cooling 1) where it cools down to a temperature between 750° C. and 550° C. at a cooling rate between 20° C./s to 50° C./s. During this Cooling 1, the desired fraction of ferrite forms by the transformation of the initial austenite fraction present at the beginning of the cooling trajectory. After completion of Cooling 1, the tube enters the next cooling regime (indicated as Cooling 2), where it is cooled at a rate greater than 50° C./s down to ambient temperature. During Cooling 2, the majority of the remaining austenite phase transforms into martensite to impart strength.

The choice of cooling trajectory is dependent upon the chemical composition and final microstructure desired and thus, the final mechanical properties of the tube. Type 1 cooling trajectory is used for compositions with low hardenability where the ferrite formation to the desired final volume fraction will occur within an practical time period during the Cooling 1 regime of less than 60 seconds.

Figure 9:
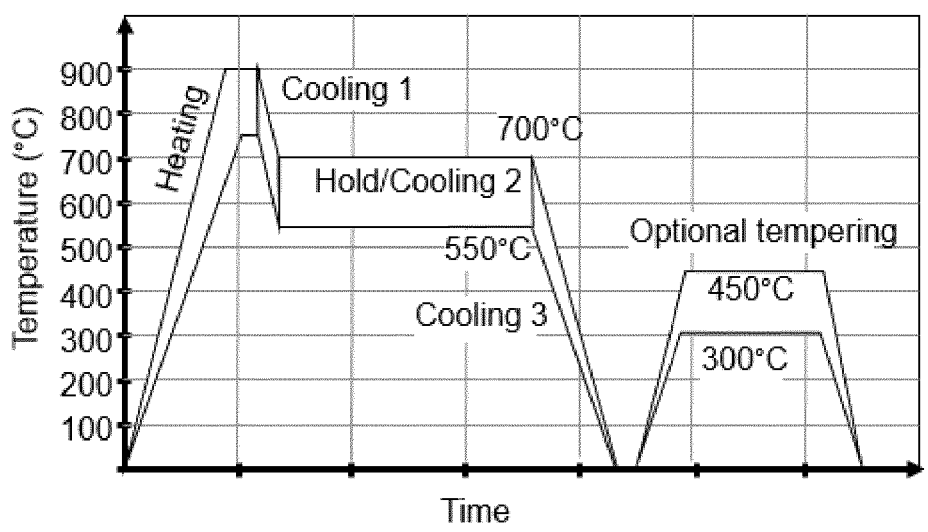
FIG. 9 shows a schematic of a heat treatment with a Type 2 cooling trajectory (fast cooling, hold, fast cooling).

In FIG. 9 a schematic is shown of a heat treatment with a Type 2 cooling trajectory (fast cooling, hold, fast cooling), where there is an intermediate cooling regime (indicated as Hold/Cooling 2) in the range between 750° C. and 550° C. After heating to achieve at least 50% austenite in the microstructure, the tube passes through a cooling regime (indicated as Cooling 1) where it cools down to a temperature between 700° C. and 550° C. at a cooling rate greater than 50° C./s. During this cooling phase some ferrite may form. Upon completion of Cooling 1, the tube enters the next regime (Hold/Cooling 2), where it is held/cooled at a rate slower than 10° C./s for a period less than 60 seconds at or down to a temperature between 700° C. and 550° C. During this Hold/Cooling 2, the desired fraction of ferrite forms by the transformation of the initial austenite fraction present at the beginning of the cooling trajectory. After Hold/Cooling2, the tube enters Cooling 3 where it is cooled at rate greater than 50° C./s down to ambient temperature. During Cooling 3, the majority of the remaining austenite phase transforms into martensite to impart strength.

This Type 2 cooling trajectory where the intermediate cooling regime (Hold/Cooling 2) in the range of 750° C. and 550° C. is used in at least two scenarios. The first is for compositions with high hardenability where the ferrite formation to the desired final volume fraction will occur within an practical time period of less than 60 seconds only if the tube material is cooled to and held at a temperature between 750° C. and 550° C. This enhanced transformation rate is a consequence of the optimal combination of nucleation and growth of ferrite grains. An alternative and/or additional reason for Type 2 cooling trajectory where the intermediate cooling regime (Hold/Cooling 2) in the range of 750° C. and 550° C. is the increased undercooling increases the nucleation rate of ferrite and results in a finer microstructure with greater strength and ductility that is possible by Type 1 cooling trajectory.

Figure 10:
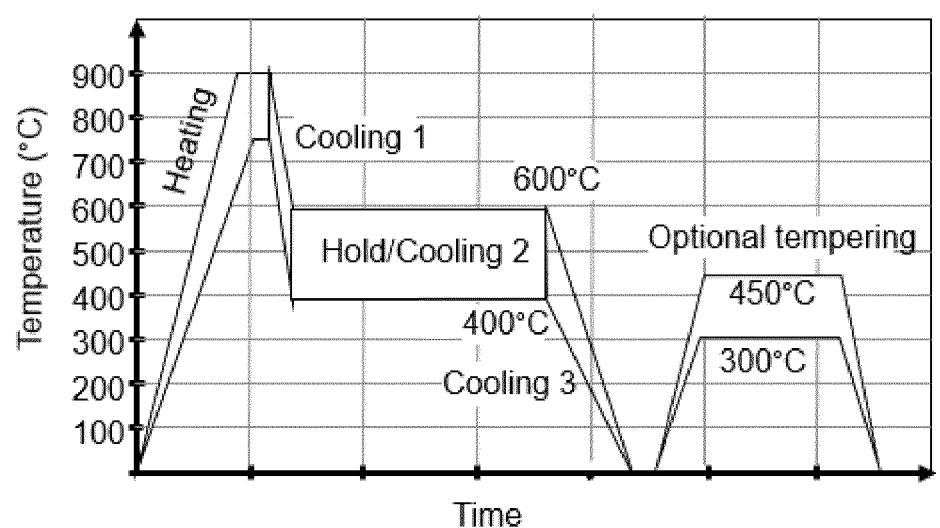
FIG. 10 shows a schematic of the heat treatment with a Type 2 cooling trajectory (fast cooling, hold, fast cooling).

In FIG. 10 a schematic is shown of the heat treatment with a Type 2 cooling trajectory (fast cooling, hold, fast cooling), where there is an intermediate cooling regime (indicated as Hold/Cooling 2) in the range of 600° C. and 400° C. After heating to achieve at least 50% austenite in the microstructure, the tube passes through a cooling regime (indicated as Cooling 1) where it cools down to a temperature between 600° C. and 400° C. at a cooling rate greater than 50° C./s. After Cooling 1, the tubes enters Hold/Cooling 2, where it is held/cooled at a rate slower than 10° C./s for a period less than 60 seconds at or down to a temperature between 600° C. and 400° C. During Hold/Cooling 2, the desired fraction of bainite microstructure constituent forms by the transformation of the initial austenite fraction present at the beginning of the cooling trajectory. After completion of Hold/Cooling 2, the tube enters the next cooling regime (indicated as Cooling 3) where it is cooled at rate greater than 50° C./s down to ambient temperature. During Cooling 3, the majority of the remaining austenite phase transforms into martensite to impart further strength.

This Type 2 cooling trajectory where the intermediate cooling regime (Hold/Cooling 2) in the range of 600° C. and 400° C. is used when bainite instead of ferrite is required. Ferrite in the form of bainite can be advantageous as it is finer grained than the polygonal ferrite form. When the majority matrix phase is bainite, higher strength levels can be achieved, typically with ultimate tensile strength of 800 MPa of higher. The particular difference compared to when the majority matrix phase is polygonal or epitaxial ferrite is that the tensile yield strength is also high, being approximately 0.75 of the ultimate tensile strength.

After the aforementioned heating and cooling steps, the heat treatment may comprise a further treatment called tempering where the tube once it is cooled to below 150° C., is passed through a section where it is heated to a temperature between 300° C. and 450° C. for a period of 5-60 seconds, after which it is cooled down to room temperature.

Tempering is used to soften the hard martensite phase to increase ductility and formability mechanical properties as well as increasing the tensile yield strength.

In further embodiments the method is one wherein the produced tube is cut to trade-lengths or one wherein the produced tube is coiled on a spool, after which the tube is held at a constant temperature between 200° C. and 450° C., and then cooled to room temperature.

The invention claimed is:
1. A method for manufacturing of steel tube from a steel strip, wherein the steel strip material has the following composition in wt %:
C: 0.08-0.3,
Mn: 1.0-3.0,
Si: 0.01-1.5,
P: <0.01,
S: <0.01,
Cr: 0-0.6,
Mo: 0-0.6,
V: 0-0.3,
Ti: 0-0.3,
Nb: 0-0.3,
B: 0-0.005,
balance Fe and unavoidable impurities, the method comprising the steps of:
providing a length of steel strip to the process,
roll forming a tube of the steel strip,
welding the formed tube in longitudinal direction along a length of the formed tube,
giving the entire formed tube a heat treatment,
wherein:
the steps are performed in one continuous in-line manufacturing line,
the heat treatment comprises a heating regime to austenitise the tube such that in successive cross-sections of the tube a microstructure is achieved which holds at least 50 vol % austenite and, after the tube is subjected to the heating regime, a cooling regime to re-introduce ferrite, and/or bainite in desired volume fractions, wherein the minimum fraction of ferrite in each section is 50 vol %, wherein the cooling regime is selected from the group consisting of:

the tube is cooled down at a rate in the range of 20-50° C/s to a temperature in the range of 750-550° C. and subsequently cooled down at a rate greater than 50° C/s;

the tube is cooled down at a rate greater than 50° C/s to a temperature in the range of 700-550° C. and thereafter held or slow-cooled at a cooling rate of up to 10° C/s for up to 60s to a temperature in said range whereafter it is cooled down at a rate greater than 50° C/s, and the tube is cooled down at a rate greater than 50° C/s to a temperature in the range of 600-400° C. and thereafter held or slow-cooled at a cooling rate of up to 10° C/s for up to 60s to a temperature in said range, whereafter it is cooled down at a rate greater than 50° C/s; and wherein, either:

1) the heat treatment is varied among sections of the tube in order to manufacture the tube sections having various grades having respective different combinations of controlled mechanical properties of yield strength, ultimate tensile strength, and elongation from a singular steel chemistry made from one and the same steel strip material, wherein the tube comprises said sections respectively having as the combinations of controlled mechanical properties:

a. a yield strength in a range of 600-800 MPa, an ultimate tensile strength of 500-900 MPa and an elongation in a range of 15-30%, b. a yield strength in a range of 800-1000 MPa, an ultimate tensile strength of 750-1200 MPa and an elongation in a range of 10-25%, and c. a yield strength in a range of 1000-1200 MPa, an ultimate tensile strength of 950-2000 MPa and an elongation in a range of 5-25%, or 2) the heat treatment is used varied among sections of the tube to manufacture tube of a single grade having a singular combination of mechanical properties from a variety of steel chemistries, and wherein the tube comprises said sections of respective different chemistries selected from said variety of chemistries and having the singular combination of mechanical properties selected from the group consisting of:

a. a yield strength in a range of 600-800 MPa, an ultimate tensile strength of 500-900 MPa and an elongation in a range of 15-30%, b. a yield strength in a range of 800-1000 MPa, an ultimate tensile strength of 750-1200 MPa and an elongation in a range of 10-25%, and c. a yield strength in a range of 1000-1200 MPa, an ultimate tensile strength of 950-2000 MPa and an elongation in a range of 5-25%;

wherein the combination of steel chemistry and the heat treatments achieve a respective balance of ferrite, martensite, bainite and austenite to achieve the recited respective combination of mechanical properties of yield strength, ultimate tensile strength, and elongation for the respective steel chemistry, wherein the manufacturing of the tube is carried out at a line speed in the range of 50 150 m/min such that the heat treatment is carried out while moving the tube in the one continuous in-line manufacturing line at the line speed in the range of 50-150 m/min.

2. The method according to claim 1, wherein the heat treatment incorporates heating the tube to a temperature in between the Ac1 and Ac3 temperature or above the Ac3 temperature of the composition of the steel, or incorporates heating the tube to a temperature in between the Ae1 and Ae3 temperature or above the Ae3 temperature of the given composition of the steel and holding it at said temperature.

3. The method according to claim 1, wherein the heating regime which is such that in all successive cross-sections of the tube a microstructure is achieved which holds at least 50 vol % austenite, is realised by heating the tube to a temperature between the Ac1 and Ac3 temperature which is at least half of the sum of the Ac1 and Ac3 temperature for a given composition of the steel strip material.

4. The method according to claim 1, wherein after the tube is subjected to the heating regime, the tube is cooled down at a rate in the range of 20-50° C/s to a temperature in the range of 750-550° C. and subsequently cooled down at a rate greater than 50° C/s.

5. The method according to claim 1, wherein after the tube is subjected to the heating regime, the tube is cooled down at a rate greater than 50° C/s to a temperature in the range of 700-550° C. and thereafter held or slow-cooled at a cooling rate of up to 10° C/s for up to 60s to a temperature in said range whereafter it is cooled down at a rate greater than 50° C/s.

6. The method according to claim 1, wherein after the tube is subjected to the heating regime, the tube is cooled down at a rate greater than 50° C/s to a temperature in the range of 600-400° C. and thereafter held or slow-cooled at a cooling rate of up to 10° C/s for up to 60s to a temperature in said range, whereafter it is cooled down at a rate greater than 50° C/s.

7. The method according to claim 1, wherein after cooling to a temperature below 150° C. the tube is reheated for a period of up to 60s to a temperature in the range of 300-450° C., after which it is cooled to ambient temperature.

8. The method according to claim 1, wherein the tube is heated by means of induction heating.

9. The method according to claim 1, wherein the heating of the tube is done in a controlled atmosphere.

10. The method according to claim 1, wherein separate tubes cut from the manufactured tube have uniform mechanical properties over their length.

11. The method according to claim 1, wherein the heating of the tube is done in a controlled nitrogen-hydrogen atmosphere.

12. The method according to claim 1, wherein the cooling regime comprises cooling at a first time-temperature trajectory and wherein the steel strip material consists of the following composition in wt %:

C: 0.08-0.3,
Mn: 1.0-3.0,
Si: 0.01-1.5,
P: <0.01,
S: <0.01,
Cr: 0-0.6,
Mo: 0-0.6,
V: 0-0.3,
Ti: 0-0.3,
Nb: 0-0.3,
B: 0-0.005,
balance Fe and unavoidable impurities.

13. The method according to claim 1, wherein the cooling regime comprises cooling at a first time-temperature trajectory, wherein the cooling regime comprises cooling at a second time-temperature trajectory after the first time-temperature trajectory.

14. The method according to claim 13, wherein the second time-temperature trajectory cools faster than the first time-temperature trajectory.

15. The method according to claim 13, wherein the cooling regime comprises an intermediate time-temperature trajectory between the first time-temperature trajectory and the second time-temperature trajectory, wherein intermediate time-temperature trajectory has a slope of zero.

16. The method according to claim 1, wherein the heat treatment is variable in order to manufacture tube having the sections having the various grades having the controlled mechanical properties from the singular steel chemistry, including:
   a. the yield strength in the range of 600-800 MPa, the ultimate tensile strength of 500-900 MPa and the elongation in a range of 15-30%, resulting from the singular steel chemistry in combination with respective said heat treatment,
   b. the yield strength in the range of 800-1000 MPa, the ultimate tensile strength of 750-1200 MPa and the elongation in the range of 10-25%, resulting from the singular steel chemistry in combination with respective said heat treatment, and
   c. the yield strength in the range of 1000-1200 MPa, the ultimate tensile strength of 950-2000 MPa and the elongation in the range of 5-25%, resulting from the singular steel chemistry in combination with respective said heat treatment.

17. The method according to claim 16, wherein separate tubes cut from the manufactured tube have respective mechanical properties that are uniform mechanical properties over their length, wherein a cut tube has the yield strength in the range of 600-800 MPa, the ultimate tensile strength of 500-900 MPa and the elongation in a range of 15-30%,
a cut tube has the yield strength in the range of 800-1000 MPa, the ultimate tensile strength of 750-1200 MPa and the elongation in the range of 10-25%, and
a cut tube has the yield strength in the range of 1000-1200 MPa, the ultimate tensile strength of 950-2000 MPa and the elongation in the range of 5-25%.

18. The method according to claim 1, wherein the heat treatment is used to manufacture tube of the single grade having the singular set of mechanical properties from the variety of steel chemistries.

19. The method according to claim 18, wherein separate tubes cut from the manufactured tube have respective mechanical properties that are uniform mechanical properties over their length, wherein the separate cut tubes have the singular set of mechanical properties with a respective one of the variety of steel chemistries.

20. The method according to claim 1, wherein the heat treated tube is coiled, wherein
   the heat treatment incorporates heating the tube to a temperature in between the Ac1 and Ac3 temperature or above the Ac3 temperature of the composition of the steel, or incorporates heating the tube to a temperature in between the Ae1 and Ae3 temperature or above the Ae3 temperature of the given composition of the steel and holding it at said temperature, or
   the heating regime is such that in all successive cross-sections of the tube a microstructure is achieved which holds at least 50 vol % austenite, is realised by heating the tube to a temperature between the Ac1 and Ac3 temperature which is at least half of the sum of the Ac1 and Ac3 temperature for a given composition of the steel strip material.

* * * * *